(12) United States Patent
Ma et al.

(10) Patent No.: US 9,089,097 B2
(45) Date of Patent: Jul. 28, 2015

(54) METHOD FOR IMPROVING SURVIVAL RATE OF DIRECTLY-PLANTED SEEDLING AND TRANSPLANTING SEEDLING OF HALOXYLON PLANT IN DESERT OR SEMI-DESERT ENVIRONMENT

(76) Inventors: Hao Ma, Jiangsu (CN); Tian Yu, Jiangsu (CN); Cai Ren, Jiangsu (CN); Xiaoling He, Jiangsu (CN)

( * ) Notice: Subject to any disclaimer, the term of this patent is extended or adjusted under 35 U.S.C. 154(b) by 0 days.

(21) Appl. No.: 14/122,092

(22) PCT Filed: Jun. 24, 2011

(86) PCT No.: PCT/CN2011/076292
§ 371 (c)(1),
(2), (4) Date: Nov. 25, 2013

(87) PCT Pub. No.: WO2012/159293
PCT Pub. Date: Nov. 29, 2012

(65) Prior Publication Data
US 2014/0075839 A1    Mar. 20, 2014

(30) Foreign Application Priority Data

May 26, 2011   (CN) .......................... 2011 1 0139499

(51) Int. Cl.
| | | |
|---|---|---|
| A01G 1/00 | (2006.01) | |
| A01G 7/00 | (2006.01) | |
| A01G 13/00 | (2006.01) | |
| A01G 7/06 | (2006.01) | |
| A01G 13/02 | (2006.01) | |
| A01G 9/10 | (2006.01) | |

(52) U.S. Cl.
CPC *A01G 13/00* (2013.01); *A01G 1/00* (2013.01); *A01G 7/06* (2013.01); *A01G 9/102* (2013.01); *A01G 13/02* (2013.01)

(58) Field of Classification Search
CPC ......... A01G 9/104; A01G 9/10; A01G 9/102; A01G 9/021; A01G 13/06; A01G 13/08; A01C 11/02; A01C 5/02; A01C 5/04
USPC ............... 47/58.1 R, 65.5, 73, 77, 65, 1.01 T, 47/1.01 P, 2, 32, 32.7, 32.8, 66.7, 74, 44, 47/45, 58.1 SE; 111/114, 106, 919, 100, 111/900
See application file for complete search history.

(56) References Cited

U.S. PATENT DOCUMENTS

| | | | | |
|---|---|---|---|---|
| 3,828,473 | A * | 8/1974 | Morey ...................... | 47/58.1 R |
| 4,333,265 | A * | 6/1982 | Arnold ............................. | 47/74 |
| 5,345,711 | A * | 9/1994 | Friesner ........................ | 47/32.4 |
| 6,119,392 | A * | 9/2000 | Lais ............................... | 47/29.2 |
| 6,263,613 | B1 * | 7/2001 | King et al. ....................... | 47/30 |
| 6,378,247 | B1 * | 4/2002 | Takahashi ......................... | 47/75 |
| 6,553,713 | B2 * | 4/2003 | Chiu .............................. | 47/17 |
| 2010/0115835 | A1 * | 5/2010 | Ronneke ....................... | 47/65.7 |

FOREIGN PATENT DOCUMENTS

| | | | | |
|---|---|---|---|---|
| CN | 1336102 | A | 2/2002 | |
| CN | 1449649 | A * | 10/2003 | ............. A01G 23/00 |
| CN | 2722610 | Y | 9/2005 | |
| CN | 100563425 | | * 12/2009 | ............. A01G 23/00 |
| CN | 101803549 | A | 8/2010 | |
| CN | 101810122 | A | 8/2010 | |
| CN | 101965788 | | * 2/2011 | ............... A01G 1/00 |
| CN | 101965788 | A | 2/2011 | |
| GB | 2045044 | A * | 11/1980 | ............... A01G 9/00 |
| GB | 2265535 | A * | 6/1993 | ............. A01G 13/00 |

OTHER PUBLICATIONS

International Search Report; mailed Aug. 11, 2011; PCT/CN2011/076292.

* cited by examiner

*Primary Examiner* — Andrea Valenti
(74) *Attorney, Agent, or Firm* — Flener IP Law; Zareefa B. Flener

(57) ABSTRACT

The present invention belongs to the field of forest ecological culture and discloses a method for improving the survival rate of a directly-planted seedling and a transplanting seedling of a haloxylon plant in desert or semi-desert environment. In desert and semi-desert areas meeting a certain condition, the base part of the stem of the directly-planted seedling or the transplanting seedling of the haloxylon plant is protected by using a cylindrical pipe or hollow bullet-shaped pipe of a certain specification from damage or even death caused by stress factors such as a ground surface layer at high temperature. Through the present invention, the survival rate of a directly-planted seedling and a transplanting seedling of the haloxylon plant under extremely stress conditions in the desert and semi-desert areas can be obviously improved, and the average improvement rate is over 50%, the quick growth and development of individuals are promoted and the annual mass growth is increased. The present invention is characterized by strong operability, good repeatability, high efficiency and simple method, and the method has a very great significance for the large-scale ecological restoration and reconstruction of haloxylon plants in the desert and semi-desert areas.

8 Claims, 2 Drawing Sheets a  b

METHOD FOR IMPROVING SURVIVAL RATE OF DIRECTLY-PLANTED SEEDLING AND TRANSPLANTING SEEDLING OF HALOXYLON PLANT IN DESERT OR SEMI-DESERT ENVIRONMENT

TECHNICAL FIELD

The present invention belongs to the field of forest ecological culture and discloses a method for improving the survival rate of a directly-planted seedling and a transplanting seedling of a *haloxylon* plant in desert or semi-desert environment.

TECHNICAL BACKGROUND

There are 11 kinds of Chenopodiaceae *haloxylon* plants in the world. They are mainly distributed in extensive desert areas from the Mediterranean to Central Asia and grow in moving sand dune, semi-fixed dune, salty soil and gravel gobi. China has *Haloxylon ammodendorn* (C.A.Me.) Bunge which is also called *Haloxylon ammodendorn* and *Haloxylon apphyllum* (Minkw), and *Haloxylon persicum* Bunge ex Boiss et Bushse. *Haloxylon ammodendorn* (C.A.Me.) Bunge is super xerophytic dungarunga and high arbuscular. The plant height is generally 2 to 3 m and individual plant can be 10 m high. The crown is generally dense and of semi spherical or approximate oval. *Haloxylon ammodendorn* (C.A.Me.) Bunge community with high canopy density in the desert looks like the forest landscape. Therefore, people usually call densely distributed *haloxylon* plants as "*Haloxylon ammodendorn* (C.A.Me.) Bunge Forest" previously. The distribution area of *haloxylon* plant is about $1170 \times 10^4$ hm$^2$, accounting for 9% in China's total area of deserts. It is mainly distributed in deserts areas such as Xinjiang, Inner Mongolia, Qinghai, Gansu, Ningxia, etc. in Northwest China. However, *Haloxylon persicum* Bunge ex Boiss et Bushse is only distributed in the north of Xinjiang. *Haloxylon ammodendorn* (C.A.Me.) Bunge with the strongest stress resistance is a strong xerophytic-halphilous plant. Its ecological amplitude is wide and characterized by drought resistance, high temperature resistance, salt and alkali resistance and wind erosion resistance, it is a kind of plant with excellent wind prevention, sand fixation and ecological protection. In addition, *Haloxylon ammodendorn* (C.A.Me.) Bunge with solid wood and strong firepower is excellent firewood. It is reputed as "live coal in the desert"; its annual shoot is rich in nutrition and is excellent livestock feed; in addition, it is also the host of cistanche deserticola-"desert ginseng" which has high economic and development value. *Haloxylon ammodendorn* (C.A.Me.) Bunge is precious plant resource in desert and semi-desert areas in Northwest China and also tree species with maximum dune-fixation forestation area in arid desert areas in China. It has irreplaceable economic position and important utility value in sand prevention and stabilization, mitigating desertification and maintaining ecological safety. However, due to human factors and environmental degradation, resources of *Haloxylon ammodendorn* (C.A.Me.) Bunge and *Haloxylon persicum* Bunge ex Boiss et Bushse are destroyed so seriously that they have become vulnerable and listed as national endangered three-level protection plants. Hence, it is an important project of northwest ecological construction to accelerate restoration and construction of *haloxylon* plant forest.

However, there are many difficulties during natural restoration and rapid construction of *haloxylon* plant forest. A critical problem is that the survival rate of a directly-planted seedling and a transplanting seedling of a *haloxylon* plant is extremely low. A lot of field surveys indicate that the survival rate of natural sprouting in native place of *Haloxylon ammodendorn* (C.A.Me.) Bunge and *Haloxylon persicum* Bunge ex Boiss et Bushse and manually-planted seedling is only about 1%. And the survival rate of manually transplanted annotinous and biennial *Haloxylon ammodendorn* (C.A.Me.) Bunge sapling is only about 10%. Namely, many seedlings sprouting in spring, manually-planted seedlings, and transplanted seedlings die from spring to autumn. It was held that the main reason was extreme degradation of desert environment of native range of *Haloxylon ammodendorn* (C.A.Me.) Bunge and *Haloxylon persicum* Bunge ex Boiss et Bushse. High temperature and drought cause the seedling and sapling to die. In addition, some seedlings are buried by wind-sand and gnawed by animals. However, findings of surveys and researches of the project group in Gurbantunggut Desert area in Junggar Basin for many years indicate that desert environment of native range of *Haloxylon ammodendorn* (C.A.Me.) Bunge and *Haloxylon persicum* Bunge ex Boiss et Bushse are not seriously short of water. Even sandy soil layer below 60 cm is filled with abundant suspension moisture from the arid middle ten days of June to the last ten days of August. *Haloxylon ammodendorn* (C.A.Me.) Bunge and *Haloxylon persicum* Bunge ex Boiss et Bushse generally sprout or bud from the middle ten days of March to the last ten days of April. As there are many snows and rains in spring, shallow sand is filled with water. The root of a seedling or sapling grows rapidly and the root length can exceed 60 cm at the middle ten days of June; as the sandy soil layer below 60 cm is still filled with suspension moisture after the middle ten days of June, growth demand of seedling can be satisfied basically. Thus, drought is not the important reason that causes death to *haloxylon* plant seedling. High temperature (air temperature) is not the main reason causing death to a lot of *Haloxylon ammodendorn* (C.A.Me.) Bunge and *Haloxylon persicum* Bunge ex Boiss et Bushse seedlings. The experimental research indicates that a seedling and sapling can grow normally under 50° C. high temperature environment of several successive days with certain moisture. In addition, burying of wind-sand and animal gnawing do cause death to seedling. But it is not the main reason causing a lot of deaths. *Haloxylon ammodendorn* (C.A.Me.) Bunge and *Haloxylon persicum* Bunge ex Boiss et Bushse have strong sand burying resistance and regeneration capacity.

Findings of surveys and researches for many years indicate that high temperature (≥50° C., average temperature) of ground surface layer (0 to 2 cm) in desert and semi-desert areas is critical and the important reason causing death to a lot of deaths of seedlings of *haloxylon* plants. The ecological environment in the desert and semi-desert hinterland in Northwest China is extremely bad in summer. The temperature of the ground surface layer can reach above 60° C. and extreme temperature of the ground surface layer can reach about 80° C. For instance, as for Gurbantunggut Desert hinterland in Junggar Basin of Xinjiang, June to August is dry and of little rain in summer. The temperature is high and the temperature of the ground surface layer is higher. The air temperature at daytime often exceeds 40° C. and the temperature of the ground surface layer can reach about 75° C. High temperature of the ground surface layer often poses serious damage stress to plants. The reaction part of threat lies in the connection between the base part of the stem of plant and the ground surface. Plants undergo significant physiological reaction due to the threat of high temperature stress. Plant with light reaction grows slowly or stagnates at the overground part and the underground part. Plants with serious reaction directly cause the whole plant to die. Desert plants such as *Haloxylon ammodendorn* (C.A.Me.) Bunge and *Haloxylon persicum* Bunge ex Boiss et Bushse have strong stress resistance. However, the seedling and sapling cannot endure high temperature stress of the ground surface layer above 60° C. for a long time. It is just the reason that causes the low survival rate of natural seedling, directly planted seedling and transplanted seeding of *haloxylon* plants in Gurbantunggut Desert hinterland of Xinjiang. It not only causes community dominated by *haloxylon* plants to be hard to recover after damage, but also poses difficulty to afforestation. In addition, the high temperature of ground surface layer causes seedling (below 5 years old), sampling (5-10 years old) and bearing tree (above 10 years old) of *haloxylon* plants to "be summer dormant". The growth is caused to be slowed down or stagnated. Thus, the annual valid growing period is shortened and annual increment is reduced. A precedent can fully interpret that the high temperature of ground surface layer is the critical factor causing death to a seedling and sapling of *Haloxylon ammodendorn* (C.A.Me.) Bunge and *Haloxylon persicum* Bunge ex Boiss et Bushse. Only a few years ago, a certain forestry bureau in Altay Prefecture, Xinjiang planted and transplanted *Haloxylon ammodendorn* (C.A.Me.) Bunge and *Haloxylon persicum* Bunge ex Boiss et Bushse of 3000 Mu around the management and protection station of public welfare forest in administered Karamori Mountain Nature Reserve. The area is a typical ecological environment of Gurbantunggut Desert hinterland. To improve the survival rate of *Haloxylon ammodendorn* (C.A.Me.) Bunge and *Haloxylon persicum* Bunge ex Boiss et Bushse, they adopted measures such as irrigating root, grass grid sand prevention, etc. Instead of protecting sapling of *Haloxylon ammodendorn* (C.A.Me.) Bunge and *Haloxylon persicum* Bunge ex Boiss et Bushse from high temperature stress of the ground surface layer. The 3000 Mu saplings of *Haloxylon ammodendorn* (C.A.Me.) Bunge and *Haloxylon persicum* Bunge ex Boiss et Bushse died after two years. Above instances show that if we are to restore and build an ecological forest of *Haloxylon ammodendorn* (C.A.Me.) Bunge and *Haloxylon persicum* Bunge ex Boiss et Bushse on a large scale in desert or semi-desert environment in Northwest China, the critical issue that seedling and sapling of *Haloxylon ammodendorn* (C.A.Me.) Bunge and *Haloxylon persicum* Bunge ex Boiss et Bushse are protected from high temperature stress of ground surface layer shall be overcome.

In light of the reason, the applicant provides a method to protect *haloxylon* plants with protective screening at the time of applying for CN101965788A of patent for invention in China to improve the survival rate of a seedling. However, the method of adopting protective screening has the following defects in desert and semi-desert areas with strong wind-sand: ①The sunshade net is easy to be damaged and the sand in the base part is easy to be blew away to expose a gap and anchorage claw, which influences the effect of preventing gnawing of small animals, moisturizing, preventing damage and burying of wind-sand and reducing temperature of the ground surface layer. ②The sunshade net has holes and the moisturizing effect is relatively weak. ③The sunshade net is easy to be damaged and the sand in the base part is easy to be blown away. As a result, the maintenance cost is relatively high each year. ④The production cost of protective screening is relatively high. The production price of each one is RMB 5.00-6.00. Furthermore, it should be produced manually, wasting time and energy.

SUMMARY

The objective of the present invention is to provide a method for improving the survival rate of a directly-planted seedling and a transplanting seedling of a *haloxylon* plant in desert or semi-desert environment during the large-scale forest restoration and construction, so as to solve the key problems during the large-scale forest restoration and construction in desert or semi-desert environment such as the low seedling survival rate and the slow individual growth: the former is caused by stress factors such as a surface layer at a frequent and extremely high temperature of ground surface, and the latter is caused by the frequent "summer dormancy" phenomenon. The objective of the present invention can be implemented through the following technical schemes.

A method for improving the survival rate of a directly-planted seedling and a transplanting seedling of a *haloxylon* plant in desert or semi-desert environment is provided, where a directly-planted seedling and a transplanting seedling of a *haloxylon* plant in desert or semi-desert environment is protected by using a cylindrical pipe or hollow bullet-shaped pipe, and specifically the method comprises:

(1) The structure, type and specification of the cylindrical pipe or hollow bullet-shaped pipe: The cylindrical pipe is suitable for sowing or transplanting a seedling of a *haloxylon* plant on a desert or non-mobile desert or sand dune, and the cylindrical pipe is further capable of being subdivided into a cylindrical pipe for a directly-planted seedling and a cylindrical pipe for a transplanting seedling; the outer diameter of the cylindrical pipe for a directly-planted seedling is from 9 to 12 cm, the height thereof is from 17 to 20 cm, and the pipe wall thickness thereof is from 0.25 to 0.30 cm; the outer diameter of the cylindrical pipe for a transplanting seedling is from 6 to 8 cm or from 9 to 12 cm, the height thereof is from 20 to 30 cm, and the pipe wall thickness thereof is from 0.25 to 0.30 cm; the hollow bullet-shaped pipe is suitable for transplanting the seedling of the *haloxylon* plant on a semi-mobile desert or sand dune where sands are greatly blown by the wind, the outer diameter of the upper opening thereof is from 3 to 5 cm, the outer diameter of the lower opening thereof is from 6 to 12 cm, the total height thereof is from 40 to 60 cm, the upper opening closing part height thereof is from 3 to 8 cm, and the pipe wall thickness thereof is from 0.25 to 0.30 cm;

(2) Plant material: Seeds and annotinous and biennial seedlings of the *haloxylon* plant are included;

(3) Embodiment time: Sowing or transplanting the seeds and seedlings of the *haloxylon* plant in November of the early winter in that year to April in next year; and (4) Embodiment method: ①when the seed of the *haloxylon* plant is sown on an immobile desert or sand dune, firstly one end of the cylindrical pipe for a directly-planted seedling is buried or inserted into sandy soil and 12 to 15 cm thereof is left over the ground; then soil is piled around the periphery of the part of the pipe over the ground, and the height of the piled soil is from 6 to 8 cm, ground surfaces inside and outside the pipe are staggered by over 6 cm, and the opening of the upper edge of the pipe is at a distance over 4 cm from the upper edge of the surface of the peripheral piled soil of the pipe, and finally the seeds are sown on the sandy soil in the pipe and are covered with soil of height about 1 cm; ②when the seedling of the *haloxylon* plant is transplanted on an immobile desert or sand dune, firstly the seedling of the *haloxylon* plant is implanted into sandy soil at a depth over 40 cm; then the cylindrical pipe for transplanting seedling sleeves the seedling from top to bottom, and is further inserted into the sandy soil by 5 cm; finally, soil is piled around the periphery of the part of the pipe over the ground, the height of the piled soil is above 15 cm, and ground surfaces inside and outside the pipe are staggered by over 15 cm; see FIG. 3 for the active modes of the above two cylindrical pipes; and ③ when the seedling of the haloxylon plant is transplanted on a mobile desert or sand dune where sands are greatly blown by the wind, firstly the seedling of the haloxylon plant whose selected stem height is above 70 cm is implanted into sandy soil at a depth equal to or greater than 40 to 60 cm, then the hollow bullet-shaped pipe sleeves the seedling from top to bottom, and one end thereof with a larger diameter is further inserted into the sandy soil by 20 to 40 cm (FIG. 4).

The method for improving the survival rate of a directly-planted seedling and a transplanting seedling of a haloxylon plant in desert or semi-desert environment further comprises maintenance and management steps, and specifically the method is: a seedling of the haloxylon plant to be sown or transplanted needs to be protected consecutively by use of a cylindrical pipe or hollow bullet-shaped pipe for 3 to 5 years, during which seedling supplement or seed supplement is performed for a dead seedling in spring in time, a cylindrical pipe or hollow bullet-shaped pipe damaged due to exposure to the weather is appropriately cleaned and replaced, and a cylindrical pipe or hollow bullet-shaped pipe slanted and buried under the action of sands blown by the wind needs to be supported upright and be subjected to sandy soil removal.

The cylindrical pipe or hollow bullet-shaped pipe is made of a material such as PVC, asbestos tile, ceramic or perlite, with priority given to PVC. The cylindrical PVC pipe can be cut from the PVC water pipe with the diameter of 7.5 or 11 cm widely used in the current housing construction, to form the nipple opened at both ends. The hollow bullet-shaped PVC pipe is made up of the cylindrical PVC pipe with one end after the hot melt compression, or made by other methods. Due to the relatively small opening at the upper end of PVC pipe, it can block the direct eating by large herbivores; at the same time, as a result of the smooth wall of PVC pipe, it can, to a certain extent, prevent small animals (herbivorous insects) from climbing into the pipe to eat the haloxylon seedlings.

The method of implementing the present invention shall satisfy the following habitat conditions: the ecological environment of the embodiment area is relatively severe, where the extremely high temperature (≥40° C.) and drought often occur in summer (June to August), and the high temperature exceeding 55° C. of ground surface layer (1 to 2 cm) frequently occurs; but the suspension moisture content is relatively rich in shallow sandy soil (below 60 cm) in spring and summer (April to August), which can ensure the water content required for the normal growth of a haloxylon plant seedling.

In the present invention, the method for improving the survival rate of a directly-planted seedling and a transplanting seedling of a haloxylon plant in desert or semi-desert environment is applied to forest planting at a place where the ground surface layer is at a high temperature such as wasteland and the Loess plateau.

The main reason for the extreme raising of temperature at the ground surface layer of desert sandy soil is the direct and hard light under the sunshine and the high temperature (≥30° C.), and the extreme raising of temperature at the ground surface layer can be prevented through the overshadowing at some extent for the hard light directly projected on the ground surface. The seedling can be protected by covering the base part of the stem of a haloxylon plant with a PVC pipe, so as to prevent the extreme raising of temperature at the ground surface layer and prevent the plant itself from the threat of high temperature at the ground surface layer. When the ground surface is kept at the same level inside and outside the pipe, the high temperature at ground surface outside the pipe can be transmitted to the interior due to the poor isolation effect of PVC pipe, which can also hurt the haloxylon seedling. In order to solve this problem, after transplantation, the haloxylon seedling shall be covered with a PVC pipe and embedded 5 cm below, the soil can be stocked above 10 cm at the pipe periphery, thus making the ground surface outside the pipe far higher than that inside the pipe, so as to not only isolate the heat transmission inside and outside the pipe, but also reinforce the pipe at a fixed location.

Beneficial Effects:

The present invention establishes the key technology methods for the large-scale construction of a haloxylon plant forest in the severe desert and semi-desert habitat, according to the latest research results about the effect of high temperature at ground surface layer in desert or semi-desert environment on the survival rate of a directly-planted seedling and a transplanting seedling of a haloxylon plant and on the "summer dormancy" of young trees and adult trees, and conducts the method for greatly improving the survival rate of a directly-planted seedling and a transplanting seedling of a haloxylon plant in the severe desert and semi-desert habitat and for preventing of "summer dormancy" of seedling, young trees and adult trees. The method has the following advantages:

(1) The present invention protects the directly-planted seedling and the transplanting seedling of a haloxylon plant in desert or semi-desert environment with a cylindrical pipe or a hollow bullet-shaped pipe, especially the PVC cylindrical pipe or PVC hollow bullet-shaped pipe; the protective effect of PVC pipes can form a small environment inside the pipe, which can maintain the moisture and break the wind. According to our experiences for many years, in the desert environment, spring is the key period for the germination and growth of a haloxylon seed, and the water content of 0 to 10 cm shallow sandy soil at ground surface has a decisive role on the germination and growth of a haloxylon seed; but water desorption is quite fast of shallow sandy soil in desert environment in Spring, which is mainly brought away by the strong wind at the dry ground surface. A PVC pipe can prevent the strong wind at ground surface from blowing into the pipe in spring, which can not only prevent the fast desorption of water, but also prevent the haloxylon seedling form lodging or breaking for the strong wind, in favor of the germination and growth of a haloxylon directly-planted seedling by keeping the small environment ground surface with a certain soil moisture content inside the pipe.

(2) The cylindrical pipe or hollow bullet-shaped pipe used in the present invention has a certain function to prevent the directly-planted seedling of a haloxylon plant from being embedded by the wind-sand, which can reduce the probability of seedling being embedded by the wind-sand in desert and sand dune environment with smaller or larger wind-sand; in addition, the protection of a cylindrical pipe or a hollow bullet-shaped pipe can effectively prevent the gnawing of desert animals; the cylindrical pipe or hollow bullet-shaped pipe can provide a suitable small environment for the early growth of seedlings, due to the prevention of strong wind at ground surface forming blowing in to bring away the moisture, the lower ground surface temperature inside the pipe and the slower moisture evaporation. All these characteristics can further improve the survival rate of seedling.

(3) According to our field survey and research for many years, the basic reason for the "summer dormancy" of a *haloxylon* plant is the high temperature (≥55° C.) at the ground surface. The used PVC pipe can prevent the direct projection of sunlight on the base part of the stem and its surrounding soil, which can effectively reduce the temperature, so as to prevent the "summer dormancy" of a seedling, young trees and adult trees of a *haloxylon* plant, thus greatly improving the effective annual growth and development period of a *haloxylon* plant, increasing the annual growth amount, and promoting the rapid rehabilitation and reconstruction of a *haloxylon* plant ecological forest in desert or semi-desert environment. It really has an excellent application prospect.

(4) The technology in the present invention can be further extended with the usage scope: PVC pipe can be used for the corresponding experiment and application, as long as the plant with a certain ecological and economic value fails to survive at a certain place due to the temperature at ground surface layer. In addition, the pipe materials are not limited, which can be not only the PVC but also the asbestos tile, perlite or ceramic, as long as it satisfies the requirement of simple production, inexpensive cost and sturdy and durable performance.

(5) The cylindrical PVC pipe or hollow bullet-shaped PVC pipe used in the present invention is suitable for large-scale promotion and application, due to the simple production, inexpensive cost and convenient operation.

(6) Compared with the method for improving the survival rate of *haloxylon* plant with protective screening in patent CN101965788A for invention in China, the present invention has the following advantages: ①The PVC pipe is difficult to be damaged by the sand, with better effect of preventing gnawing of small animals, moisturizing, preventing damage and burying of wind-sand and reducing temperature of ground surface layer, with longer protective years and lower maintenance cost; ②The raw materials are efficient, simple and convenient in process and making, convenient for industrial production, with lower cost and more durable performance. It only costs RMB 0.8 to 3.0 for the raw materials and processing cost of each finished PVC pipe; ③The survival rate of a directly-planted seedling and a transplanting seedling is higher, with the average improvement of 20% in desert or semi-desert environment with smaller wind-sand, with the average improvement of 50% in desert or semi-desert environment with larger wind-sand.

In conclusion, the present invention method solves the key bottleneck of extremely low survival rate of a directly-planted seedling and a transplanting seedling during the *haloxylon* plant forest construction in the severe northwest desert ecological environment, providing favorable technical support for the large-scale restoration and construction of a *haloxylon* plant forest. It really has an excellent application prospect.

EMBODIMENT METHOD

The *haloxylon* plant forest existing in the desert and semi-desert areas in Northwest China has an irreplaceable ecological service value on the prevention and fixation of sand, mitigation of desertization, and maintenance of ecological safety. However, due to the extremely severe survival environment in desert, the restoration and construction of a *haloxylon* plant artificial forest is quite difficult, with the main bottleneck of the relatively low survival rate of a directly-planted seedling and a transplanting seedling of a *haloxylon* plant; in general, the survival rate is only 1% of directly-planted seedling sown in that year, and the survival rate is only 10% of the transplanted young trees. The research shows that the key reason for the large scale death of the directly-planted seedling and transplanting seedling of a *haloxylon* plant is the stress of extremely high temperature at ground surface layer in desert or semi-desert environment. Therefore, the cylindrical pipe or hollow bullet-shaped pipe in the present invention can be used to correspondingly protect the seedling and young trees of a *haloxylon* plant, thus greatly improving the survival rate of a directly-planted seedling and a transplanting seedling.

The production of a cylindrical PVC pipe is relatively simple with quite high production efficiency, which can be cut from the PVC water pipe purchased in the market at a certain specification according to a certain size with the abrasive wheel cutting machine. The hollow bullet-shaped PVC pipe can be made from the cylindrical PVC pipe with one end after hot melt compression, which can be processed on one's own or ordered from the PVC pipe manufacturer. Before the specific determination of the application of technology in the present invention at a certain desert area or plot, the ecological environment shall be fully investigated firstly for the sufficient understanding whether this area or plot has a higher probability of extremely high temperature (≥55° C.) at ground surface layer in the hot summer. If this desert area does not have extremely high temperature at ground surface, it is not necessary to use a PVC pipe for the corresponding protection. In addition, it shall be also understood whether the sandy soil layer below 60 cm in this area has a rich amount of suspension moisture in summer (June to August); if the moisture content is relatively low, the survival rate of a directly-planted seedling and a transplanting seedling of a *haloxylon* plant will decrease greatly. If there is not a good understanding of the moisture, the present invention can be used for experiment before promotion.

Figure 1:
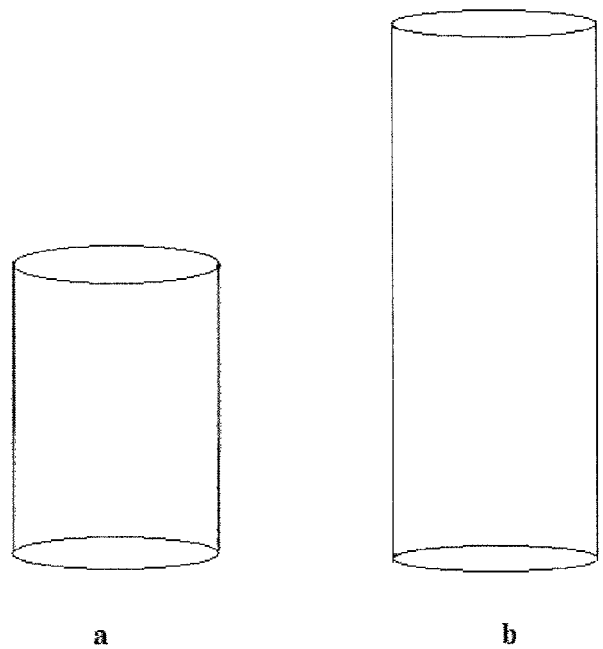
FIG. 1 is a schematic diagram of cylindrical PVC pipes for a directly-planted seedling and a transplanting seedling, where
a: cylindrical PVC pipe for directly-planted seedling, b: cylindrical PVC pipe for a transplanting seedling.
Figure 2:
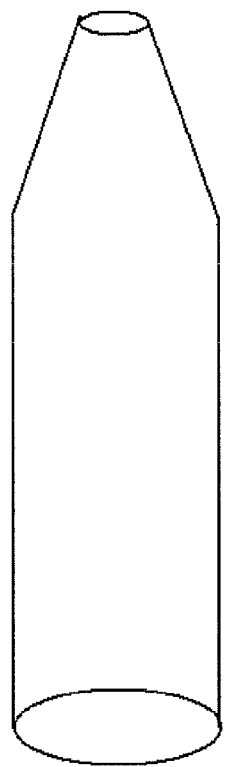
FIG. 2 is a schematic diagram of a hollow bullet-shaped PVC pipe.
Figure 3:
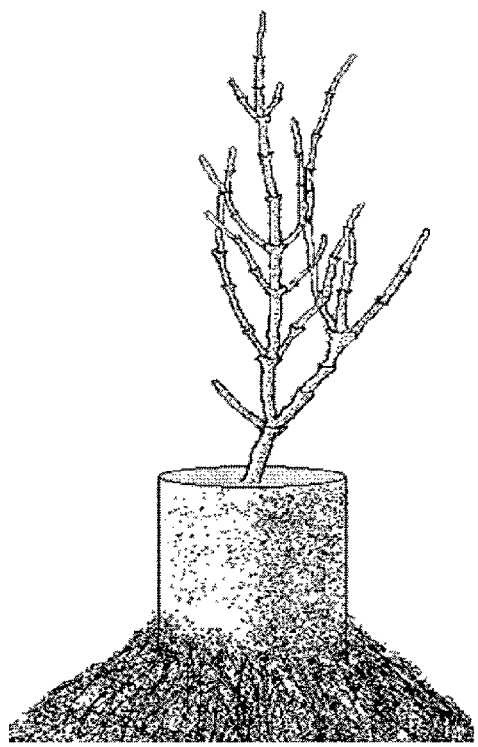
FIG. 3 is a usage state reference diagram of a cylindrical PVC pipe used for transplanting *haloxylon* seedling in non-mobile desert and sand dune environment.
Figure 4:
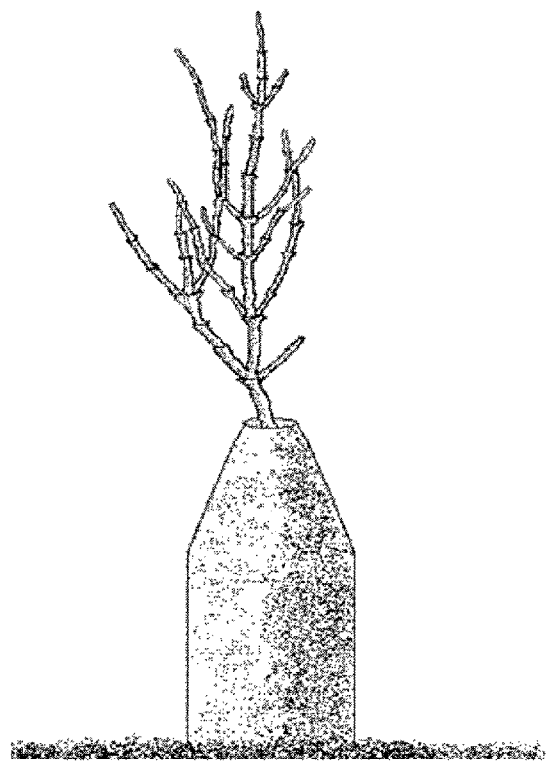
FIG. 4 is a usage state reference diagram of a hollow bullet-shaped PVC pipe used for transplanting *haloxylon* seedling in mobile desert and sand dune environment.

The PVC pipe shall be used at a suitable time to sow or transplant the *haloxylon* plant seedling, generally from November of that year to April in next year when the water content of sandy soil in desert environment is higher, easy for the survival of seedling. In the actual use of PVC pipes, the usage methods are slightly different for the three kinds of pipes. With respect to the cylindrical PVC pipe for the directly-planted seedling (referred to as "the directly-planted seedling PVC pipe", similarly hereinafter, see FIG. 1a for the diagram), insert or embed one end of pipe into the sandy soil, and sow the seeds of *Haloxylon ammodendorn* (C.A.Me.) Bunge or *Haloxylon persicum* Bunge ex Boiss et Bushse on the surface of pipe sandy soil and cover it with some soil (1 to 2 cm thick), and then stock the soil at the pipe periphery to finish the whole sowing process. With respect to the cylindrical PVC pipe for the transplanting seedling (referred to as "the transplanting seedling PVC pipe", similarly hereinafter, see Fig. b for the diagram), implant the *Haloxylon ammodendorn* (C.A.Me.) Bunge or *Haloxylon persicum* Bunge ex Boiss et Bushse seedlings in the sandy soil about 40 cm deep, and carefully cover the transplanting seedling from the top down, insert or embed the pipe into the sandy soil, and then stock the soil at the pipe periphery to finish the transplanting process. With respect to the hollow bullet-shaped PVC pipe (see FIG. 2 for the diagram), implant the *Haloxylon ammodendorn* (C.A.Me.) Bunge or *Haloxylon persicum* Bunge ex Boiss et Bushse seedlings in the sandy soil about 40 to 60 cm deep, and carefully cover the transplanting seedling from the top down from the larger opening end, insert or embed the larger opening end (namely the end at a larger diameter) of the pipe into the sandy soil about 20 to 40 cm deep, and the transplanting process can be finished without stocking the soil. The protection of PVC pipe will last 3 to 5 years for the *Haloxylon ammodendorn* (C.A.Me.) Bunge and *Haloxylon persicum* Bunge ex Boiss et Bushse directly-planted seedlings and transplanting seedlings, so that the PVC pipe and seedlings shall be correspondingly managed and maintained every year, mainly including the seedling supplement of a dead seedling, the replacement and support of the damaged and slanted PVC pipe.

Embodiment 1

The method is shown as follows for improving the survival rate of a directly-planted seedling and a transplanting seedling of a *haloxylon* plant by using a PVC pipe in desert or semi-desert environment:

(1) Embodiment location: the desert and sand dune near Cainan Oilfield in Junggar Basin of Xinjiang; Desert near one non-commercial forest stand of KaLaMaiLiShan Nature Reserve at the center of Gurbantunggut Desert.

(2) Embodiment scale: 300 *haloxylon* directly-planted seedlings and 900 biennial *haloxylon* transplanting seedlings;

(3) Embodiment time: Apr. 9, 2010;

(4) Embodiment method: at the desert and sand dune area (with small wind-sand, non-mobile desert and non-mobile sand dune) near Cainan Oilfield in Junggar Basin of Xinjiang, the directly-planted seedling is protected with directly-planted seedling PVC pipe; insert or embed one end of the directly-planted seedling PVC pipe (with the external diameter of 11 cm, the height of 17 cm, and the pipe wall thickness of 0.28 cm) into the sandy soil about 5 cm deep with 12 cm remained above the ground, and then sow the *Haloxylon ammodendorn* (C.A.Me.) Bunge or *Haloxylon persicum* Bunge ex Boiss et Bushse seedlings on the surface of pipe sandy soil and cover it with some soil (about 1 cm), at then stock the soil at the pipe periphery to finish the whole sowing process at the height of 8 cm, so as to make the ground surface level inside and outside the pipe stagger more than 6 cm, and make the upper edge of the pipe more than 4 cm away from the upper edge of the mound surface. The transplanting seedling is protected with a transplanting seedling PVC pipe; implant the *Haloxylon ammodendorn* (C.A.Me.) Bunge or *Haloxylon persicum* Bunge ex Boiss et Bushse seedlings into the sandy soil about 40 cm deep, cover the transplanting seedling from the top down with the transplanting seedling PVC pipe at the diameter of 11 cm, height of 30 cm, upper convergent section height of 6 cm, pipe wall thickness of 0.28 cm, insert or embed the larger opening end of the pipe into the sandy soil about 5 cm deep, and then stock the soil at the pipe periphery to finish the transplanting process at the height of 15 to 20 cm, so as to make the ground surface level inside and outside the pipe stagger more than 15 cm. At the desert area (with large wind-sand and semi-mobile sand dune) near one non-commercial forest stand of KaLaMaiLiShan Nature Reserve at the center of Gurbantunggut Desert, the transplanting seedling is protected with a hollow bullet-shaped PVC pipe, implant the *haloxylon* plant seedlings higher than 70 cm into the sandy soil about 40 to 60 cm deep or above, and cover the seedling from the top down with the hollow bullet-shaped pipe (at the upper diameter of 3 cm, the lower diameter of 11 cm, the height of 40 to 60 cm, and the pipe wall thickness of 0.28 cm), further insert the pipe into the sandy soil about 20 to 40 cm;

(5) Maintenance and management: seedling supplement or seed supplement is performed for a dead seedling in spring time, a cylindrical pipe or hollow bullet-shaped pipe damaged due to exposure to the weather is appropriately cleaned and replaced, and a cylindrical pipe or hollow bullet-shaped pipe slanted and buried under the action of sands blown by the wind needs to be supported upright and be subjected to sandy soil removal.

(6) Effect: after more than one year's test in the extremely severe desert environment, among the *haloxylon* directly-planted seedlings and transplanting seedlings processed with the above technology methods, it is shown in the investigation and statistics at the beginning of September, 2010 that: 40% of directly-planted seedlings still survive, and the survival rates are above 60% and 50% for the transplanting seedlings respectively protected with a transplanting seedling PVC pipe and a hollow bullet-shaped PVC pipe.

The invention claimed is:

1. A method for improving the survival rate of a directly-planted seed of a haloxylon plant in a desert or semi-desert environment at a place where at 1 to 2 cm below the ground surface layer is a temperature $\geq 50°$ C., comprising the steps of:
   providing an unperforated cylindrical pipe,
      wherein the pipe has an outer diameter of from 9 to 12 cm, a height from 17 to 20 cm, and a wall thickness from 0.25 to 0.30 cm;
   providing at least one seed of the haloxylon plant;
   sowing the seed, wherein sowing comprises:
      burying a first end the cylindrical pipe into sandy soil leaving 12 to 15 cm above the surface of the ground;
      piling soil around the outside, above ground surface periphery of the pipe to a height of from 6 to 8 cm such that the ground surfaces inside and outside the pipe are staggered by at least 6 cm, and such that the opening of a second unburied end of the pipe is at a distance of over 4 cm from an upper edge of the soil on the outside, above ground surface of the pipe,
      planting the seeds in the sandy soil in the pipe and covering the seeds with soil to a height of 1 cm, thereby improving the survival rate of the directly-planted seed of the haloxylon plant.

2. The method according to claim 1, further comprising:
   using the pipe consecutively for 3 to 5 years;
   supplementing seedlings by removing dead seedlings in the spring time;
   supplementing a damaged pipe due to exposure to the weather by cleaning and/or replacing the damaged pipe;
   correcting a pipe slanted and buried under the action of sands blown by the wind by rendering it upright and removing any unwanted sandy soil.

3. The method according to claim 1, wherein the cylindrical pipe is made of a material selected from the group consisting of PVC, asbestos tile, ceramic or and perlite.

4. The method according to claim 3, wherein the cylindrical pipe is made of PVC.

5. The method according to claim 1, wherein the method is applied to forest planting.

6. The method according to claim 1, wherein the desert or semi-desert environment is a wasteland or the Loess plateau.

7. A method for improving the survival rate of a transplanting seedling of a haloxylon plant in a desert or semi-desert environment at a place where at 1 to 2 cm below the ground surface layer is a temperature ≤50° C., comprising the steps of:
    providing an unperforated cylindrical pipe,
        wherein the pipe has an outer diameter of 6 to 8 cm or from 9 to 12 cm, a height from 20 to 30 cm, and the pipe wall thickness is from 0.25 to 0.30 cm;
    providing a seedlings of the haloxylon plant;
    transplanting a seedling of a haloxylon plant, comprising the steps of:
        implanting haloxylon plant into sandy soil at a depth of over 40 cm,
        arranging the pipe over the top of the implanted seedling down towards the ground surface,
        further inserting the pipe 5 cm into the soil; and
        piling soil around the outer periphery of the pipe to a height above 15 cm above the surface of the ground and so that the ground surfaces inside and outside the pipe are staggered by over 15 cm, thereby improving the survival rate of the transplanting haloxylon plant.

8. A method for improving the survival rate of a directly-planted seedling and a transplanting seedling of a haloxylon plant in a desert or semi-desert environment with blowing sand at the surface and at a place where temperature 1 to 2 cm below the ground surface layer is at a high temperature ≥50° C., comprising the steps of:
    providing an unperforated hollow bullet shaped pipe, having an upper end opening diameter of from 3 to 5 cm and a lower end opening diameter of from 6 to 12 cm, a total height from 40 to 60 cm, an upper opening closing height of from 3 to 8 cm, and a wall thickness of from 0.25 to 0.30 cm;
    providing a seedling of the haloxylon plant at least 70 cm in length;
    implanting the seedling into the soil at a depth of between about 40 to 60 cm;
    arranging the pipe over the top of the seedling and down towards the ground surface; and
    further inserting the lower opening end of the pipe into the sandy soil ground surface by 20 to 40 cm, and
        wherein soil is piled on an outside periphery of the pipe to a height of at least 10 cm above the ground surface whereby the outside top surface is at least 10 cm higher than the ground surface inside the pipe.

* * * * *